2,956,028
METHODS FOR PREPARING LUMINESCENT MATERIALS

Joseph A. Davis, Marion, Ind., assignor to Radio Corporation of America, a corporation of Delaware No Drawing. Filed May 23, 1958, Ser. No. 737,216

5 Claims. (Cl. 252—301.6)

This invention relates to methods for preparing luminescent materials, and particularly but not necessarily exclusively, to improved methods for preparing silver-activated zinc and zinc-cadmium sulfide phosphors.

Luminescent materials, or phosphors, are generally prepared by firing at an elevated temperature a mixture of host crystal material, one or more of activators as salts thereof, and a flux. The flux comprises one or more compounds usually halides, and is generally believed to serve the following purposes:

(a) Aid recrystallization of the host crystal.
(b) Aid incorporation of the activator into the host crystal.
(c) Reduce firing temperature.
(d) Control particle size of the product.
(e) Provide and incorporate a charge compensator into the host crystal.

For certain applications, it is desirable to shorten the persistence of zinc and zinc-cadmium phosphors. Previously, this was accomplished by activating these host crystals with silver and nickel. This double activation however, has the effect of reducing the luminescence light output.

An object of this invention is to provide improved methods for preparing luminescent materials.

Another object is to provide methods for preparing luminescent silver-activated zinc and zinc-cadmium sulfide phosphors with improved light output and shortened persistence.

In general, the objects of the invention herein are attained by the use of a combination of three particular compounds as the flux during the synthesis of the luminescent material. Specifically, it has been found that an improved product results from firing the host crystal material and an activator together with the following combination of flux compounds:

Magnesium chloride 1.0 to 4.0, preferably 2.0, weight percent
Ammonium chloride 0.5 to 4.0, preferably 2.0, weight percent
Trisodium phosphate 0.05 to 2.0, preferably 0.5 weight percent Weight percents herein are with respect to the weight of host crystal. The improved phosphors herein exhibit an improved luminescence light output and shorter persistence than similar phosphors prepared by conventional processes.

EXAMPLE

An improved blue-emitting phosphor is prepared by the following procedure. Slurry 100 grams luminescence grade zinc sulfide containing 0.011 weight percent silver with demineralized water. Add to this slurry the flux compounds: two grams magnesium chloride ($MgCl_2$), two grams ammonium chloride ($NH_4Cl$), and 0.5 gram trisodium phosphate ($Na_3PO_4$). The flux compounds may be in the anhydrous or hydrated form. This mixture is slurried and allowed to dry at 120° C. overnight. The dried mixture is lightly ground to break any lumps formed and then placed in a fused quartz beaker. The beaker is covered with a loose fitting lid and placed in a furnace at 980° C.±10° C. for a period of about 45 minutes. The sample is allowed to cool in air after which the material at the surface of the fired batch is removed and discarded. The remaining fired batch is then washed free of soluble flux compounds with portions of demineralized water and dried overnight at 120° C. The dried phosphor is passed through 200 mesh screen and stored for subsequent use.

The phosphor of the example is used as the blue-emitting component in P–4 type screens of kinescopes for black and white television. Such screens are formed by mixing the blue-emitting component with a yellow-emitting component and then settling the mixture through an aqueous medium upon the face plate of the kinescope. A common problem with P–4 screens is that the blue-emitting component has a lower light output and a longer persistence than the yellow-emitting component. The blue-emitting phosphor of the example has a light output 10 to 20 percent higher than conventional blue-emitting silver-activated zinc sulfide phosphors. The phosphor of the example also has a persistence shorter by a factor of 2 to 3 than the persistence of conventional silver-activated zinc sulfide phosphors. The conventional silver-activated zinc sulfide phosphor used for a comparison is prepared by a process similar to that of the example except that the flux is two weight percent of a combination of sodium chloride and calcium chloride.

*Host crystal.*—The improvements herein are obtained with zinc sulfide host crystals. Cadmium may be substituted for up to about 10 mol percent of the zinc and selenium may be substituted for up to about 10 mol percent of sulfur. The host crystal material is introduced into the batch as an ultrapurity luminescent-grade form of the compound itself.

*Activators.*—Silver may be replaced with one or a combination of known activators. Some suitable activators are copper, manganese, and gold. Activators may be used in proportions between 0.001 to 0.1 weight percent. In the case of manganese, up to 5 weight percent may be used. Activators are introduced as any convenient salt thereof. Silver may be introduced for example as silver nitrate, silver chloride, silver bromide, silver iodide, or, as in the example, as silver sulfide mixed with or incorporated in the host crystal material.

*Flux.*—The flux in this invention is limited to the following combinations of flux compounds:

Magnesium chloride 1.0 to 4.0, preferably 2.0, weight percent
Ammonium chloride 0.5 to 4.0, preferably 2.0, weight percent
Trisodium phosphate 0.05 to 2.0, preferably 0.5, weight percent The effect of varying the proportion of flux compounds within the foregoing ranges is as follows:

Increasing the concentration of either magnesium chloride or ammonium chloride above 2 weight percent will shorten persistence still further. However, it is accompanied by an increase in particle size and decrease in light output. Decreasing the concentration of magnesium chloride or ammonium chloride below 2.0 weight percent yields phosphors with longer persistence than that obtained employing the preferred concentration.

Increasing the concentration of trisodium phosphate produces both an increase in light output and a shift of color toward the green region of the spectrum. The maximum shift occurring at the 0.1 weight percent concentration. Little shift occurs above this concentration. The maximum light output is obtained with 0.5 weight percent. Trisodium phosphate does not materially affect the persistence.

*Firing.*—Firing is carried out in any manner commonly used in the phosphor art. It is preferred to use a temperature between 900 and 1100° C. for the host crystals herein. It is also preferred to fire in an atmosphere that is chemically inert to the batch being fired. In the example, the batch is fired in a covered beaker. The batch could also be fired in a neutral atmosphere, such as nitrogen or argon. Increases in firing temperature produces a longer persistence and a lower light output. Decreases in firing temperature produce the reverse effect in the product.

The firing time depends upon the size of the batch and the temperature. The smaller the batch the shorter the firing time. For batches of one pound or less, 45 minutes is sufficient. For six pound batches, 150 minutes may be required. The higher the firing temperature, the shorter the firing time.

*Tests.*—To determine light output, the phosphor sample is settled through an aqueous silicate solution upon a 2″ x 2″ glass plate. The settled plate is dried and placed in a demountable cathode ray apparatus. The coating is then excited with a cathode ray beam raster. The relative emission intensity is then compared with the various samples and a standard.

To determine emission color, the emission from the foregoing 2″ x 2″ plates is passed to an automatic recording spectroradiometer. Emission intensity versus wavelength is plotted.

To determine persistence a sample of the dry phosphor powder is placed in a demountable cathode ray apparatus and excited with 8 kv. square wave cathode ray pulses. The intensity of emission is measured during excitation and at 10 and 40 milliseconds (ms.) after removing the excitation. The recorded values are percent of the emission intensity during excitation.

*Data.*—The table gives data for a representative group of phosphors prepared according to the invention compared with previous phosphors. All of the phosphors of the table are silver-activated zinc sulfide ZnS:Ag (0.011) prepared according to the example except as listed.

of silver, copper, gold and manganese together with the following combination of flux compounds:

Magnesium chloride 1 to 4 weight percent
Ammonium chloride 0.5 to 4.0 weight percent
Trisodium phosphate 0.05 to 2 weight percent 2. A method for preparing a luminescent material comprising firing zinc sulfide and between 0.001 and 0.1 weight percent of an activator selected from the group consisting of silver, copper, gold and manganese together with the following combination of flux compounds:

Magnesium chloride 1 to 4 weight percent
Ammonium chloride 0.5 to 4.0 weight percent
Trisodium phosphate 0.05 to 2 weight percent 3. A method for preparing a luminescent material comprising firing zinc sulfide, 0.001 to 0.1 weight percent silver as a salt thereof with the following combinations of flux compounds:

Magnesium chloride 1 to 4 weight percent
Ammonium chloride 0.5 to 4.0 weight percent
Trisodium phosphate 0.5 to 2 weight percent 4. A method for preparing a luminescent material comprising firing at a temperature between 900 and 1100° C. zinc sulfide, 0.001 to 0.1 weight percent silver as a salt thereof with the following combinations of flux compounds:

Magnesium chloride 1 to 4 weight percent
Ammonium chloride 0.5 to 4.0 weight percent
Trisodium phosphate 0.5 to 2 weight percent 5. A method for preparing a luminescent material comprising firing at a temperature at between 970 and 990° C. for a period of between 45 to 150 minutes a mixture consisting essentially of zinc sulfide containing about 0.011 weight percent silver, and the following combination of the flux compounds:

Magnesium chloride 2 weight percent
Ammonium chloride 2 weight percent
Trisodium phosphate 0.5 weight percent

*Table*

| Type of Flux* | ICI Color Coordinates | | Percent Persistence at— | | Firing | | Visual Efficiency | Sample Size |
|---|---|---|---|---|---|---|---|---|
| | x | y | 40 ms. | 10 ms. | Time, Min. | Temp., ° C. | | |
| 1 | 0.148 | 0.103 | 5.0 | 15.0 | 120 | 980 | 91 | 5 lb. |
| 1 | 0.150 | 0.100 | 5.0 | 11.0 | 120 | 980 | 96 | 5 lb. |
| 2 | 0.150 | 0.100 | 1.7 | 4.8 | 95 | 980 | 107 | 5 lb. |
| 2 | 0.150 | 0.105 | 2.1 | 6.3 | 45 | 980 | 105 | 1 lb. |
| 2 | 0.149 | 0.109 | 1.6 | 4.1 | 45 | 980 | 113 | 100 g. |
| 2 | 0.150 | 0.111 | 2.2 | 5.3 | 40 | 980 | 104.5 | 100 g. |
| 2 | 0.150 | 0.110 | 3.6 | 6.6 | 60 | 980 | 96.7 | 100 g. |
| 2 | 0.150 | 0.112 | 2.7 | 5.8 | 60 | 940 | 101.4 | 100 g. |
| 3 | 0.151 | 0.112 | 2.5 | 6.1 | 60 | 980 | 101.8 | 100 g. |
| 4 | 0.153 | 0.084 | 3.0 | 5.5 | 40 | 980 | 75.3 | 100 g. |
| 5 | 0.153 | 0.082 | 2.0 | 4.9 | 40 | 980 | 76 | 100 g. |

*Type of flux.
1=Standard flux mixture: total 2 weight percent NaCl+CaCl$_2$NH$_4$Cl.
2=2% MgCl$_2$+2% NH$_4$Cl+0.5% Na$_3$PO$_4$ low persistence flux mixture.
3=1% MgCl$_2$+1% NH$_4$Cl+0.5% Na$_3$PO$_4$.
4=1% MgCl$_2$+2% NH$_4$Cl.
5=2% MgCl$_2$+2% NH$_4$Cl.

What is claimed is:

1. A method for preparing a luminescent material comprising firing a zinc sulfide wherein 0 to 10 mol percent of the zinc therein is substituted with cadmium and 0 to 10 mol percent of the sulfur therein is substituted with selenium, and between 0.001 and 0.1 weight percent of an activator selected from the group consisting References Cited in the file of this patent

UNITED STATES PATENTS

| | | |
|---|---|---|
| 2,310,425 | Goodman | Feb. 9, 1943 |
| 2,402,759 | Leverenz | June 25, 1946 |
| 2,421,207 | Leverenz | May 27, 1947 |
| 2,597,660 | McKeag | May 20, 1952 |
| 2,614,082 | Smith | Oct. 14, 1952 |
| 2,732,347 | Ward | Jan. 24, 1956 |
| 2,818,391 | Crosby | Dec. 31, 1957 |